F. HYMANS.
MOTOR CONTROL APPARATUS.
APPLICATION FILED OCT. 20, 1914.
1,225,963.
Patented May 15, 1917.
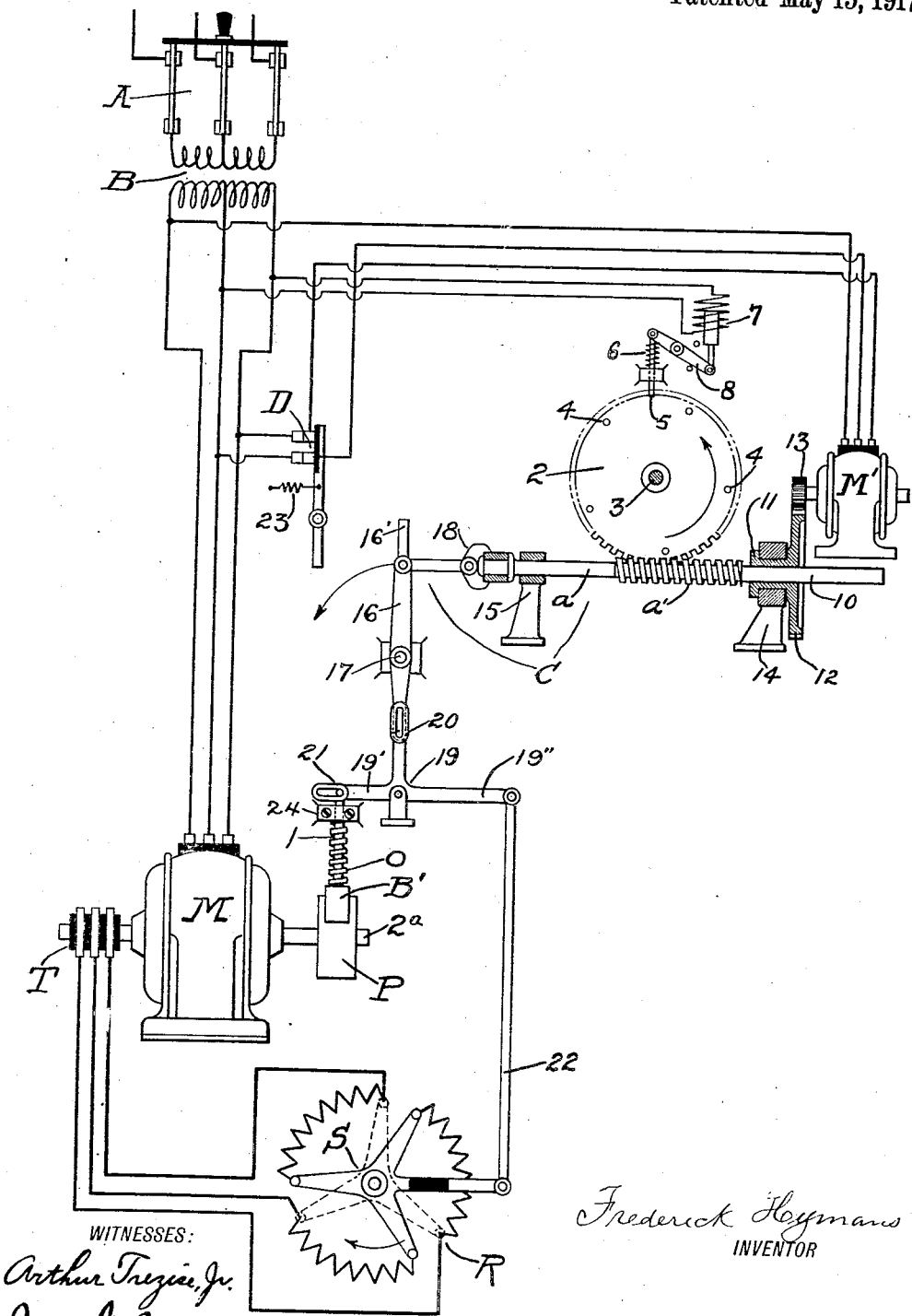
WITNESSES:
Arthur Trezise, Jr.
James G. Bothell
Frederick Hymans
INVENTOR
BY
L. H. Campbell
ATTORNEY

UNITED STATES PATENT OFFICE.

FREDERICK HYMANS, OF GLEN RIDGE, NEW JERSEY, ASSIGNOR TO OTIS ELEVATOR COMPANY, OF JERSEY CITY, NEW JERSEY, A CORPORATION OF NEW JERSEY.

MOTOR-CONTROL APPARATUS.

1,225,963.  Specification of Letters Patent.  Patented May 15, 1917.

Application filed October 20, 1914. Serial No. 867,590.

*To all whom it may concern:*

Be it known that I, FREDERICK HYMANS, a citizen of the Netherlands, residing in Glen Ridge, in the county of Essex and State of New Jersey, have invented a new and useful Improvement in Motor-Control Apparatus, of which the following is a specification.

My invention relates to improvements in brake apparatus, and more particularly to an improved form of actuating mechanism therefor, which is adapted more particularly for use with the larger types of power units, such for example as are used in the operation of furnace hoists, etc.

Essentially the invention consists of a pilot motor or other translating device adapted in this instance to be operated by an alternating current, together with brake apparatus comprising an improved connection between the pilot motor and the brake, the said connection being positive in its operation to effect the release of the brake, and being so arranged as to effect a quick application thereof with full power.

It has been found in actual practice, that in alternating current heavy duty power units, particularly, the use of alternating current electromagnets (that is of the well known plunger or reciprocating type) for operating the brake apparatus is objectionable on account of the abnormally large electromagnet requisite for a heavy duty brake, which as well as being costly to manufacture, consumes an abnormally large amount of current, and furthermore creates a great deal of noise. Thus it has become a common practice to provide a pilot motor instead of an electromagnet for actuating the brake shoes, but thus far the connections between the pilot motor and brake for actuating the latter are found objectionable for the reason that a quick application of the brake is not effected, and further on account of the see-saw action of the brake shoes which tends to release the latter. The first mentioned objectionable feature is due to the fact that the brake applying means is retarded more or less by the resistance offered through the connections between the pilot motor and the brake shoes, and also in overcoming the inertia of the rotary mass of the pilot motor at rest, and which mass is caused to spin at a comparatively high rate of speed due to the positive connection between the brake shoes and pilot motor, as the spring is applying the brake. Now the second objectionable feature is caused by the kinetic energy stored up in this spinning mass which as will readily be seen, causes such see-sawing action of the brake shoes which causes the brake shoes to be slightly released. Now to overcome these objectionable features, I have provided an improved connection between the pilot motor and brake apparatus for operating the latter, said arrangement together with other improvements being illustrated in the accompanying drawing which I will now describe in detail.

A brake pulley P may be keyed or otherwise suitably secured to the shaft $2^a$ of an electric motor M, which I will term the main motor, and which in this instance is of the alternating current type. Any of the well known forms of brake apparatus may be employed, the type herein being shown simply for the sake of illustration, and my invention, it is to be understood is applicable to all of the various other types of brake apparatus. The brake apparatus herein illustrated comprises a brake shoe B' which is normally held into frictional engagement with the brake pulley by means of a coil spring O, carried by a stem 1, which may form an integral part of the brake shoe. The upper end of the spring is seated by a fixed member 24, which serves as a guide for the stem 1. Now of course, in a brake apparatus designed for heavy duty, a very powerful spring is employed, and thus in order to effect the release of the brake shoe from the brake pulley I provide a pilot motor M' which may be operated by either a single or multi-phase current, and said pilot motor being connected by means of my improved connections C to the stem 1. This connection comprises a worm wheel 2 arranged loosely on the shaft 3, and provided with projecting pins 4, arranged to engage a stop pin 5. The pin 5 is normally held out of the path of movement of the pins 4 by means of a spring 6, and is adapted to be operated into position to be engaged by the said pins by means of an electromagnet 7 through the intermediary of the pivoted lever 8. A worm shaft $a$ carrying a worm $a'$ which meshes with the worm wheel 2 is arranged to be moved axially from the normal position as shown to the left. This result may be accomplished in numerous different ways, of which one consists in providing the shaft $a$ with a square shank 10 on its right end, which shank fits a hub 11 of a spur gear 12. An additional spur gear 13 forms a driving connection between the pilot motor M' and the gear 12. The gear 12 is rotatably mounted in a suitable standard such as 14, and the shaft $a$ at its left end is suitably supported by a standard 15. It will now be seen that this arrangement permits to impart to the worm shaft $a$ a rotary motion and simultaneously an axial motion in the direction of the arrow. A lever 16 pivoted at 17, is connected at its upper end to the shaft $a$ by means of a suitable connection, such as 18. The lever 16 is connected at its lower end to a three arm bell crank lever 19, through a slot and pin connection 20. The arm 19' of the bell crank lever is connected at 21 to the stem 1, and the arm 19'' is connected by a link 22, to a three arm switch S, which is adapted to control a starting resistance R which is connected by the slip rings T to the rotor windings of the motor M.

A main line switch A controls the supply of current which may be from any suitable source and any kind or phase, but for the purposes of illustration and clearness I show my invention as applied to a three phase alternating current system. A transformer is designated by the reference letter B.

A switch D is adapted to control the current supply to the pilot motor M', said switch being held normally in a closed position by means of a spring 23, thus establishing a circuit for the pilot motor, and being opened automatically at a predetermined time as hereinafter described, by means of an arm 16' on the lever 16.

The operation of the parts herein just described is as follows: The parts as illustrated with the exception of the main line switch A are in normal position, the said switch being normally in open position. By closing the switch A a circuit is established for the motors M and M', and also for the winding of the electromagnet 7. The pilot motor now receiving current will effect the rotation of the worm $a'$ in a clockwise direction, we will say for example, looking from the right on the drawing. The worm wheel 2 being free to turn will thus be rotated in a counter-clockwise direction as indicated by the arrow, until the pin 4 comes into engagement with the stop pin 5, which has been actuated into position to be engaged by the pin 4 by means of the electromagnet 7. The worm wheel 2 now being held fixed against rotation by the pin 5, results in the movement of the worm shaft and worm axially in the direction of the arrow, thereby actuating the lever 16 and bell crank 19 so as to release the brake shoe B' from the brake pulley P, and to effect the operation of the switch S to gradually cut out the resistance R. Finally when all the resistance is cut out, the arm 16' on the lever 16, will open the switch D, thus opening the circuit to the pilot motor which will now come to rest. It will be noted that the pin 5, through the intermediary of the connection C, now holds the brake shoe released, against the action of the spring O, and thus the brake shoe together with the switch S will be maintained in operated position until the electromagnet 7 is deënergized or the main line switch opened. Now by opening the main line switch A, the current supply is cut off from the main motor M, and also from the winding of the electromagnet 7. The winding of the latter now being deenergized permits the spring 6 to actuate the pin 5 out of engaging position with the pin 4. The action of the spring O now forces the brake shoe into frictional engagement with the brake pulley P and also returns the switch S to its normal position. It will be here noted that the only resistance offered to the spring O, is that of forcing the worm $a'$ from its extreme left hand position to which it has been operated to its normal position as shown in the drawing. In this operation the action of the worm and worm wheel is like that of a rack and pinion, and it will thus be seen that the resistance offered by these parts is of a negligible amount, the main point being that the application of the brake is effected without imparting motion to the pilot motor and gears 12 and 13. It will readily be seen that this feature is of great importance as it permits of a quick application of the brake and also eliminates the see-saw action heretofore explained.

It is to be understood that my invention is equally applicable to direct current apparatus as well as for alternating current apparatus, and furthermore I wish not to be limited to the precise details of construction and arrangements of parts, as it is obvious that those skilled in the art may make various changes therein without departing from the spirit and scope of my invention.

What I claim is:—

1. In combination with mechanism required to be operated, a translating device, means for effecting a movement of the said mechanism from an initial to an operated position by means of the translating device, means to return the mechanism to initial position without transmitting motion to the translating device, means independent of the translating device for moving the said mechanism to an initial position, and means for maintaining the said mechanism in operated position for a predetermined period of time.

2. In combination with mechanism required to be operated, a pilot motor, means for effecting a movement of the said mechanism from an initial position to an operated position by means of the pilot motor, means to return the mechanism to an initial position without imparting motion to the pilot motor, means independent of the pilot motor for moving the said mechanism to an initial position, and electrically operated means for maintaining the said mechanism in operated position.

3. In apparatus of the class described, the combination with a translating device, a member having bodily and rotary movements, means connected to the said member for operation thereby, for effecting a bodily movement of the said member in one direction by means of the translating device, and means coöperating with said first named means for effecting a return movement of said bodily movable and rotary member independently of the translating device and without transmitting motion thereto.

4. In apparatus of the class described, the combination with a translating device, a member having bodily and rotary movements, means dependent for operation on the movement of the said member bodily, and connections between the translating device and the said means for effecting a bodily movement of the said member in one direction, and means to return the said member independently of the translating device and without imparting motion thereto.

5. In apparatus of the class described, the combination with a member having bodily and rotary movements, a rotary actuating device operatively connected with the said member, and means for effecting a bodily movement of the said member in one direction by the said rotary device, and means coöperating with said first named means to effect movement of the said member independent of the rotary device in the opposite direction and without imparting motion thereto.

6. The combination with apparatus required to be actuated, of a member operatively connected thereto having bodily and rotary movements, a pilot motor, and means arranged to move the member bodily from an initial position to an operated position by the operation of the pilot motor, and means to return the member independently of and without transmitting motion to the pilot motor.

7. In apparatus of the class described, the combination with a member having bodily and rotary movements, apparatus connected therewith for operation thereby, a pilot motor, and means for effecting a movement of the latter bodily in one direction by means of the pilot motor, and means for effecting a return movement thereof independently of and without transmitting motion to the said pilot motor.

8. In apparatus of the class described, the combination with a member having bodily and rotary movements, apparatus connected therewith for operation thereby, a pilot motor, means between the pilot motor and said member for effecting a movement of the latter bodily in one direction by means of the pilot motor, and means for effecting the return movement of the said member, independently of and without transmitting motion to the said motor.

9. In apparatus of the class described the combination with a member having bodily and rotary movements, apparatus connected therewith for operation thereby, a pilot motor, means between the pilot motor and said member for effecting a movement of the latter, bodily a predetermined amount, means to return the member independently of and without transmitting motion to the said motor, and means for holding the said member in an operated position and against return movement for a desired period of time.

10. In apparatus of the class described, the combination with a member having bodily and rotary movements, apparatus adapted to be operated thereby, a pilot motor, means between the pilot motor and said member for effecting a movement of the latter bodily from an initial position to an operated position, means to return the latter independently of and without transmitting motion to the said motor, electromagnetic means for holding the said member in an operated position, and means for controlling the operation of the latter means.

11. In combination with apparatus required to be actuated, a member operatively connected therewith having axial and rotary movements, a pilot motor, a connection between the pilot motor and said member for effecting rotation of the latter, means dependent on the rotary motion of the said member for effecting a movement thereof axially from an initial to an operated position, and electrically operated means for holding the said member in an operated position.

12. In combination with apparatus required to be actuated, a member operatively connected therewith having axial and rotary movements, a pilot motor, means connecting the said member for rotation by the pilot motor, means dependent on the rotary motion of said member for effecting a movement thereof axially from an initial to an operated position, and means for preventing rotation of the said member when moved to an operative position.

13. The combination with a pilot motor, apparatus adapted to be actuated thereby, a member operatively connected to the said apparatus, and having axial and rotary movements, means for connecting the said member for rotation by the pilot motor, means dependent on the rotary motion of the said member for effecting a movement thereof axially, and automatically operated means for preventing rotation of the said member when moved axially a predetermined amount.

14. In apparatus of the class described, the combination with a pilot motor, a member having axial and rotary movements, apparatus dependent on axial movement of the said member for operation, means for connecting the said member for rotation by the pilot motor, gearing dependent on rotation of the said member for moving the same axially, and means for regulating the degree of movement of the latter.

15. In apparatus of the class described, the combination with a pilot motor, a member having axial and rotary movements, apparatus dependent on axial movement of the said member for operation, means for connecting the said member for rotation by the pilot motor, gearing dependent on rotation of the said member for movement of the same axially, means for controlling the pilot motor to effect a movement of the said member axially a predetermined amount, a yielding member adapted to resist the movement of the said member axially, and means for holding the said member in its operated position against the action of the said yielding member.

16. In apparatus of the class described, the combination with a pilot motor, a member having axial and rotary movements, apparatus dependent on axial movement of the said member for operation thereby, means for connecting the said member for rotation by the pilot motor, means dependent on the rotation of the said member for movement of the latter axially, means for controlling the pilot motor to effect a movement of the said member axially a predetermined amount, means associated with the apparatus to be operated positioned yieldingly to resist the said movement of the member axially, and an electrically operated member operatively associated with the first named member and operable into holding and releasing positions.

17. In brake apparatus, the combination with a brake shoe, a brake pulley, a pilot motor, mechanical connections between the brake shoe and pilot motor for operating the shoe to releasing position through operation of the pilot motor, and means for effecting the said application of the brake shoe, without transmitting motion to the pilot motor.

18. In brake apparatus, the combination with a brake shoe, a member operatively connected with the brake shoe, a pilot motor operatively connected with the said member, a connection between the pilot motor and said member for moving the latter to effect the release of the brake shoe for the pulley, and means for effecting the application of the brake shoe to the pulley without transmitting motion to the pilot motor.

19. In brake apparatus, the combination with a brake shoe, a brake pulley, a member having axial and rotary movements the said member being operatively connected to the brake shoe, a pilot motor, means between the pilot motor and said member for effecting a movement of the latter bodily by the operation of the pilot motor, a source of current supply for the pilot motor, a normally closed switch supplying current to the said motor, and means operable automatically to open the said switch upon movement of the said member a predetermined distance.

20. In brake apparatus, the combination with a brake shoe, a brake pulley, a member having axial and rotary movements operatively connected to the brake shoe, a pilot motor, means between the pilot motor and said member for effecting a movement of the latter bodily by the operation of the pilot motor, means for controlling the pilot motor to effect movement of the said member axially a predetermined amount, means for applying the brake shoe to the brake pulley, said means being positioned to resist the said axial movement of the member, and an electrically operated member movable into holding and releasing positions relatively with the first named member.

In testimony whereof, I have signed my name to this specification in the presence of two subscribing witnesses.

FREDERICK HYMANS.

Witnesses:
 WALTER C. STRANG,
 JAMES G. BETHELL.